Figure 1:
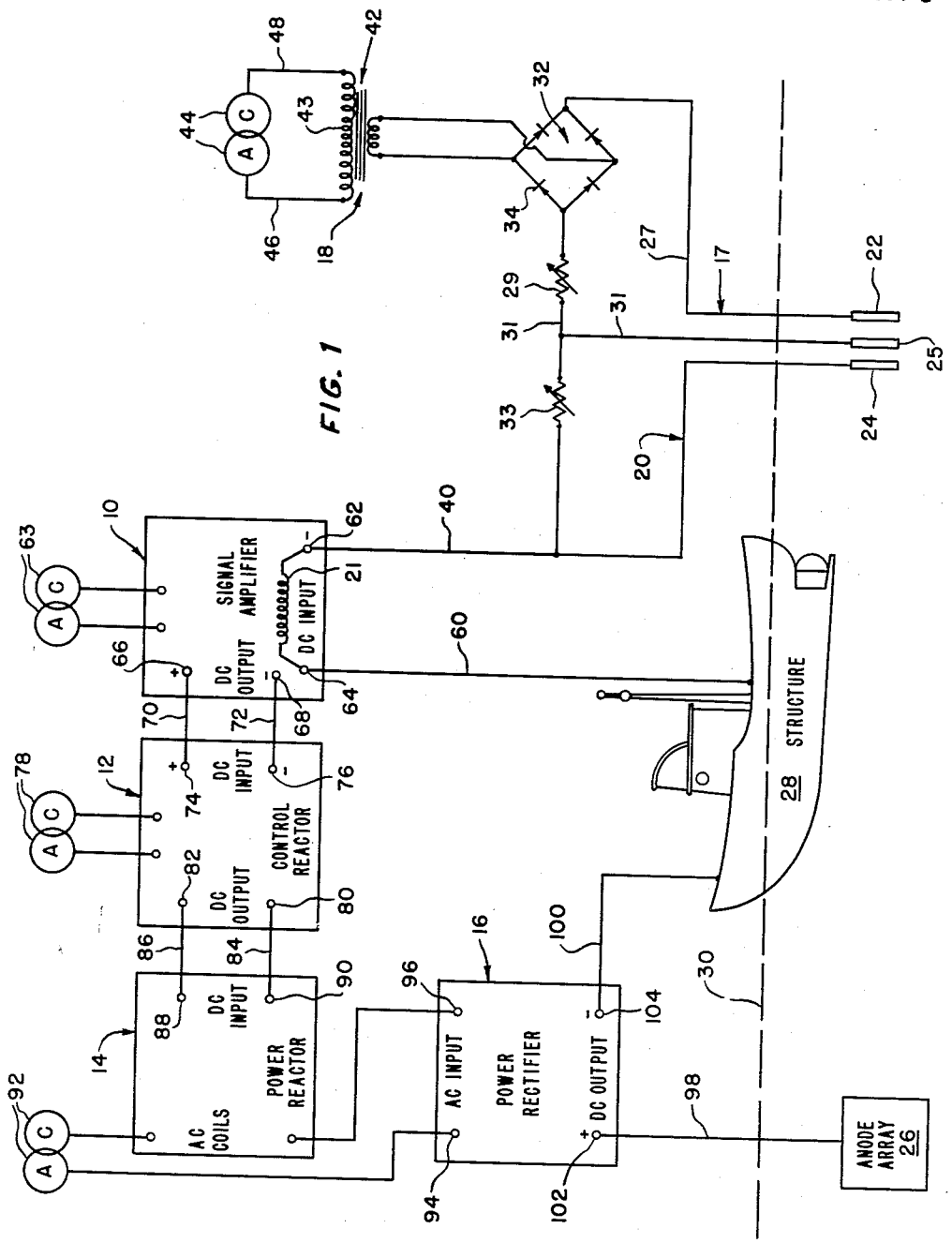

June 6, 1961

R. C. SABINS 2,987,461

CONTROL SYSTEM AND METHOD

Filed Dec. 19, 1958

3 Sheets-Sheet 1

INVENTOR.
ROLLAND C. SABINS

BY Fulwider, Mattingly
and Huitley
ATTORNEYS

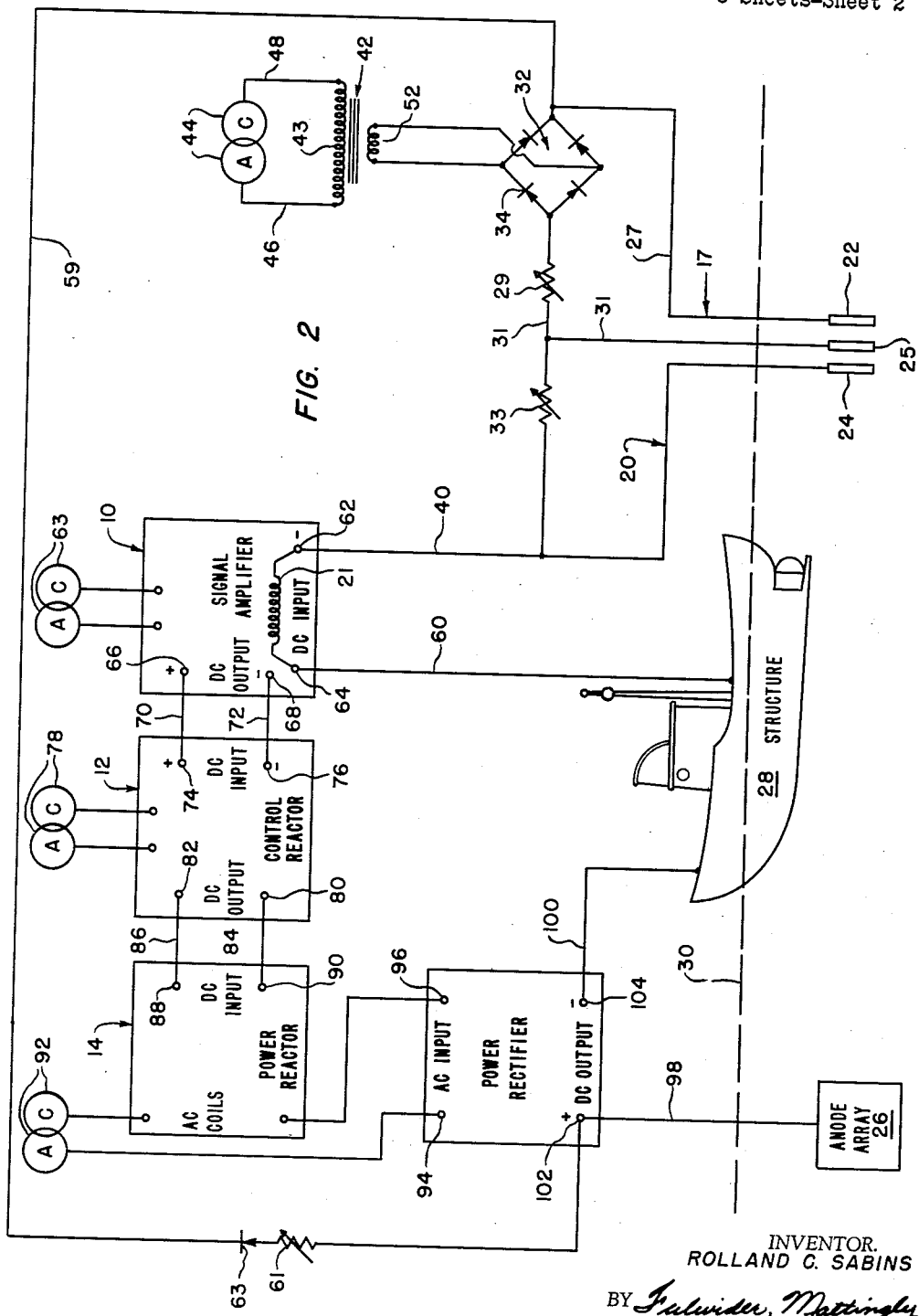

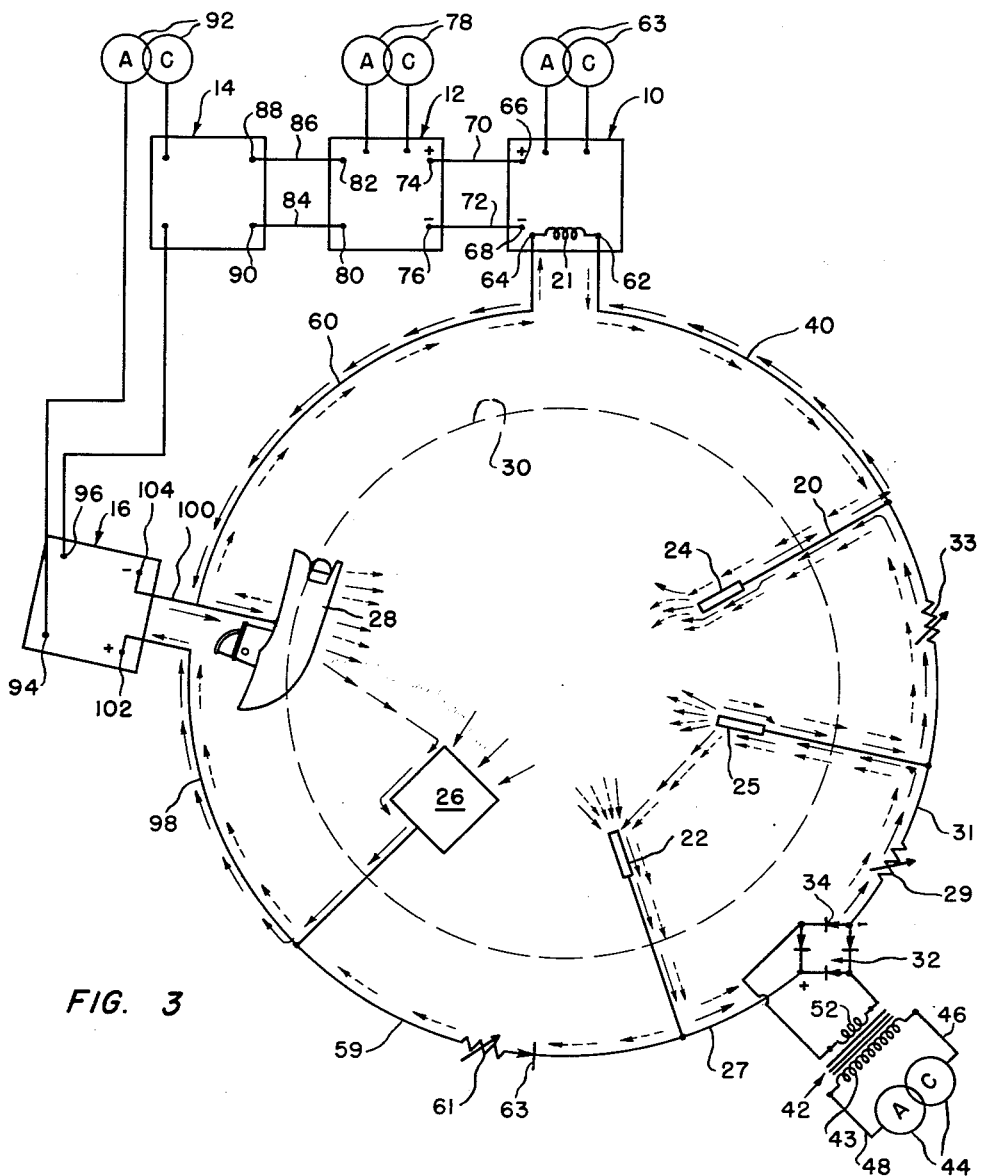

United States Patent Office 2,987,461
Patented June 6, 1961

2,987,461
CONTROL SYSTEM AND METHOD
Rolland C. Sabins, 522 Catalina Blvd.,
San Diego 6, Calif.
Filed Dec. 19, 1958, Ser. No. 781,624
29 Claims. (Cl. 204—196)

This invention relates generally to a control system and method and more particularly to a control system and method for automatically providing cathodic protection for various types of structures, vessels and the like which are normally submerged in water or some solution which acts as an electrolyte.

Control systems heretofore provided for cathodic protection have often been of a type with manually controlled means for regulating the current impressed on the submerged structure such as the hull of a ship or a barge. Such means has been found to be unsatisfactory because of the varying current requirements necessary to provide adequate protection for the submerged structure. As is well known, the current requirement to provide satisfactory protection is dependent upon many factors as for example, the speed of movement of the hull through the water, temperature, and ionic content of the water through which the hull is moving, etc. Attempts to provide automatic control to take care of these variations have heretofore not been completely satisfactory especially when subjected to shock and vibration, such as would be produced by gunfire aboard navy ships. This, in large part, has been due to the fact that apparatus of this type must function for long periods of time without maintenance because a ship carrying the system may not return to its home port for months and even years. Automatic control is also complicated by the fact that the system must operate over a wide range of impressed currents. It must respond to very small control currents and must provide magnification of a very high order. There is a need for an automatic control system which will be suitable for use on large vessels and which will require very little, if any maintenance.

Reference to current flow in the instant references is intended to mean the direction of electron flow and reference to electron flow in the electrolyte is intended to mean the direction of electron migration within the ion exchange phenomena.

In general, it is an object of the present invention to provide a control system and method which will automatically control the current impressed on the structure to be protected to maintain the structure at a predetermined polarization.

Another object of the invention is to provide a system and apparatus of the above character in which the current impressed on the structure is determined by an adjusted electrochemical reference potential.

Another object of the invention is to provide a system of the above character in which a reference circuit is always connected in the monitoring circuit.

Another object of the invention is to provide a system of the above character which has no moving parts necessary for the normal automatic functioning of the system.

Another object of the invention is to provide a system of the above character which requires very little, if any, maintenance.

Another object of the invention is to provide a system of the above character which consists of static, solid state components.

Another object of the invention is to provide a system of the above character which is highly resistant to shock and vibration.

Another object of the invention is to provide a system of the above character having inert electrodes utilized as the pilot anode and bi-polar electrodes of the reference circuit.

Another object of the invention is to provide a system of the above character in which the demand is substantially satisfied.

More specifically, the present invention contemplates a monitoring system for controlling the value of the current impressed upon a cathodic structure, subjected to an electrolyte, such as a vessel floating in water or immersed therein, which system includes a control circuit connecting the structure with a "drive" bi-polar electrode which is also immersed in the electrolyte; the monitoring system also includes a galvanic couple including a second bi-polar electrode, which is connected with the drive bipolar electrode through a resistance, a pilot anode and a source of D.C. current between the pilot anode and the bi-polar electrodes for impressing a current on said bi-polar electrodes and with common conductor between pilot anode 22 and anode array.

In carrying out the foregoing, the present invention contemplates connecting the anode array, of the impressed current cell including the structure to be protected, with the anode of the monitoring system by a solid state conductor such as metal to thereby form a closed solid state loop.

In furthering the contemplations of the foregoing and particularly that contemplated in the next preceding paragraph is to include a diode in the solid state conductor which prevents the flow of electrons from the ship's anode array to the anode of the monitoring system.

Furthermore, the system contemplates an adjusted or variable resistance in said solid state conductor.

A further object of the present invention is to provide a system of the above character in which, in the event of failure of the reference circuit potential, over-polarization of the structure is prevented and, in the instant embodiment, the means for impressing extraneous current on to the structure is rendered ineffective.

Further objects and advantages will be apparent from the following description, reference being had to the accompanying drawings wherein a preferred embodiment of the invention is illustrated.

In the drawings:
FIG. 1 is a circuit diagram incorporating certain phases of the present invention;
FIG. 2 is a circuit diagram similar to FIG. 1, but incorporating the preferred aspect of the invention in that it includes the closed solid state loop; and
FIG. 3 is another circuit diagram showing the same element as in FIG. 2 but shown so as to more clearly illustrate the closed solid state loop.

The instant application is a continuation-in-part of my co-pending applications Serial No. 586,969 filed May 24, 1956, now Patent No. 2,903,405, Serial No. 645,353 filed March 11, 1957, now abandoned, and my co-pending application Serial No. 775,523, entitled "Control System and Method," filed on or about November 21, 1958, and my co-pending application entitled "Control System and Method," filed on or about December 1, 1958, given Serial No. 777,377. Application Serial No. 775,523 teaches the employment of a reference electrode connected by a conductor to the hull of the structure to be protected. The current flow which passed through the electrolyte from the hull of the structure to such electrode was passed through a meter having a movable element responsive to the flow of reference current. This movable element in turn initiated the operation of the automatic impressed current supply means described in that application. In contrast, application Serial No. 777,377 does not depend upon the constant flow of a reference current, but instead relies upon a predetermined potential established in a reference circuit which includes an anode, a cathode, and a bi-polar electrode. In addition, no meter having a movable element is necessary to the operation of that system, and for that reason that system is extremely resistant to shock and vibration. All portions of the system, excepting the electrolyte, are made of solid state materials, and no movable elements are employed which might malfunction or fail under the stress of shock or vibration. However, in that system, it has been found that under certain conditions, when for example, the potential of the structure to be cathodically protected, was increased too high, by any extraneous influence, the reference electrode's potential would increase beyond the preset desired potential, and since the potential of the structure to be protected was dependent upon the potential of the reference electrode, the potential of the structure was maintained, for a time, above that desired, resulting in the evils of too high potential. Such condition of too high potential can arise, for example, when the structure to be protected is a ship's hull, and is disposed sufficiently close to another structure, such as another ship's hull which latter hull is being maintained cathodically at a higher voltage than that of the hull being serviced by the instant system. The higher voltage impressed current couple of the neighbor's hull impresses a higher potential galvanically than that desired on the hull being serviced by the instant system, or if a high current demand on the instant system requires a voltage increase between the anode array and structure, which in turn galvanically influences a false polarization rise to other adjacent cathode anode couples in the same electrolyte such as a reference cathode anode couple.

Therefore, it is a further object of the present invention to provide a cathodic protection system of the type in which the detrimental effect of subjecting the structure to too high voltage is substantially instantly remedied when the cause for impressing of such high potential is removed.

In general, the present invention comprises a control system and method for automatically providing cathodic protection, through an anode array, for various types of structures such as the hulls of vessels and barges, and the like, normally immersed or submerged in fresh or salt water or other electrolyte, and providing cathodic protection for various objects such as piping systems which are subjected to an electrolyte. A current is impressed on the structure to cause the structure or object to serve as a cathode, there being an anode array in the electrolyte to complete the impressed current couple. A monitoring system is provided including a conrtol circuit in which the value of the current flowing therein determines the degrees of current impressed on the structure. Such control circuit includes a "drive" bi-polar electrode being normally maintained as a high negative anode in a galvanic system with respect to the structure to be protected, the structure functioning as a cathode. As the potential of the structure tends to decrease, there is a tendency to increase the potential difference between the structure and this "drive" bi-polar electrode, resulting in an increased flow of current from said drive bi-polar electrode to the structure. The coil in the control circuit affects the polarization circuit in such manner as to increase the impression of current on the structure. Conversely, as the potential of the structure approaches to potential of the drive bi-polar electrode, the current value in the coil will be proportionately decreased, resulting in a diminishing flow of impressed polarization current on the structure. The present monitoring system also includes a second bi-polar electrode connected with the "drive" bi-polar electrode through a substantial resistance; it also includes an impressed current anode, called the "pilot" anode to distinguish it from the anodes in the structure anode array, an extraneous source of D.C. current between the pilot anode and said bi-polar electrode for impressing current on the drive bi-polar electrode, and a common conductor between the anode array and the pilot anode.

As shown in the drawings, my control system comprises, generally, impressed current power supply means which preferably includes a signal amplifier 10, a control reactor 12, a power reactor 14, and a power rectifier 16; it also includes monitoring means or a monitoring system which includes a current supply 42 and control 29, a reference circuit 20 which includes a drive bi-polar electrode 24, the conductor 40, coil 21 in the signal amplifier 10, a conductor 60, the structure 28, and the electrolyte 39. The drive bi-polar electrode 24 normally functions as a high negative anode and the structure 28 normally functions as a cathode in the galvanic circuit or reference circuit just described.

The impressed current supply means is connected between an anode array or assembly 26 and the structure 28 to be protected. The anode assembly 26 and the structure 28 are shown submerged or immersed in an electrolyte 30 which, for example, can be seawater. For illustrative purposes, I have chosen the hull of a ship as the structure or object to be protected; and the anode assembly 26 can be of any suitable type such as that disclosed in my co-pending application entitled "Electrolytic System," Serial No. 715,440, filed February 14, 1958, and preferably formed of a substantially inert anode material.

The monitoring means or system also includes a current generating system in the form of a galvanic couple circuit which is augmented or completed by any suitable extraneous source of D.C. current. This generating circuit 17 includes the pilot anode 22, a bi-polar electrode 25, both of which are immersed in the electrolyte 30, a conductor 27, a bridge 32, herein shown as full wave bridge comprising four rectifiers 34, a transformer winding 52, a resistance 29, and a conductor 31. This generating circuit 17 is connected with the reference circuit 20 through a resistance 33, the latter being connected to conductors 31 and 40. The pilot anode 22 and the bi-polar electrodes 24 and 25 can be of any suitable inert material, but are preferably made of platinum. In addition, the pilot anode 22 and the bi-polar electrodes 24 and 25 are preferably mounted very close to each other in order to minimize the effect of variations in the environment or physical characteristics of the electrolyte forming the electrolytic path between them. Electrode 24 is termed "bi-polar" because it is anodic or cathodic as the conditions of relative polarizations exist with respect to structure 28, but cathodic with respect to bi-polar electrode 25, and is defined as a "drive" bi-polar electrode as it is in a non-resisted couple with the coil 21 and the structure and for the purpose of distinguishing it from bi-polar electrode 25. Thus it will be seen that the drive bi-polar electrode 24 serves in the overall system as both a cathode and an anode, depending upon whether it is considered in relation to structure 28 or to bi-polar electrode 25 and anode 22. Bi-polar electrode 25 is so termed because it is cathodic with respect to anode 22 and negative anodic with respect to drive bi-polar electrode 24.

A suitable power source for the generating circuit 17 is provided by a transformer 42. The primary winding 43 of the transformer 42 is connected to a suitable source of A.C. power 44 by conductors 46 and 48, and the secondary winding 52 of transformer 42 is connected to the rectifier bridge 32.

Bridge 32 operates to impress a D.C. current upon the bi-polar electrode 25, the circuit therefor being completed by electrolytic action through the water path from the bi-polar electrode 25 to anode 22. By adjusting the value of resistance 29, it will be seen that the voltage, at the bi-polar electrode 25, can be adjusted to a predetermined level, and by adjusting the value of resistance 33, the desired potential is achieved and maintained in the reference circuit 20 and on the drive bi-polar electrode by the higher negative polarization level and higher electromotive driving force of the bi-polar electrode 25.

Assuming that the drive bi-polar electrode 24 and structure 28 are at the same level of potential, there will be negligible current flow through conductor 40 to signal amplifier 10 and thence back through a conductor 60 to structure 28. Under these conditions we will assume that the level of potential for hull 28 is at the proper level to afford cathodic protection. However, now assuming that the potential level of the structure 28 falls below the desired level, it will be apparent that its potential with respect to the drive bi-polar electrode 24 will change, causing an increased flow of current through conductor 40, the coil 21 of amplifier 10, and then through conductor 60 to structure 28. This increased current provides the signal which initiates or actuates the automatic impressed current supply. This amplifier 10, however, is responsive only to saturation current in the forward direction. It is important to note, therefore, that the electrical potential of reference circuit 20 can be established at a level which, if it exists on structure 28 also, will be sufficient to provide cathodic protection to structure 28, and that the monitoring system will increase the output of the impressed current supply means at any time that this established level of potential falls.

Going now to the impressed current system which is effective to raise the potential of structure 28 through utilization of the reference current flowing through the monitoring means at amplifier 10, it will be seen that amplifier 10 accepts the D.C. input at a pair of terminals 62 and 64. Amplifier 10 is supplied with power from a five volt A.C. source 63. This A.C. input is controlled by impedance as a result of the A.C. windings on the reactor cores. The controlled A.C. is rectified and supplies the D.C. output. The D.C. current in coil 21 controls the saturation of the cores, resulting in control of the D.C. output which is fed from a pair of D.C. output terminals 66 and 68, through a pair of conductors 70 and 72 to a pair of D.C. input terminals 74 and 76 of the amplifier or control reactor 12. In the present embodiment, at full output the incoming signal will fully saturate at 20 micro-amperes, in which case the amplifier 10 of the present system puts out a signal in excess of 300 microamperes. It is important to note that signal amplifier 10 is of that type which saturates only in a forward direction, that is, from terminal 62 to terminal 64. Current flowing in the opposite direction will thus be ineffective to saturate the core of amplifier 10 and, accordingly, no signal input will be made to amplifier 10 by reason of any such reverse flow. This is important, as will be seen, because if the potential of structure 28 should for some reason be greater than the potential of bi-polar electrode 24, and if a reverse flow of current through amplifier 10 would saturate the D.C. input core thereof, which as stated is not the case, the impressed current supply means would be actuated and tend to raise the potential of structure 28 to a still greater level. The reverse flow would then increase, and the system would be uncontrolled. For this reason amplifier 10 is made to saturate or be actuated only by a flow of current in the forward direction from terminal 62 to terminal 64.

Control reactor 12, which is provided with power from a suitable 110 volt A.C. source 78, then amplifies the input signal in excess of 300 milli-amperes which is fed through a pair of output terminals 80 and 82, and through a pair of conductors 84 and 86 to the D.C. input terminals 88 and 90 of power reactor 14. Reactor 14, which is connected to a suitable 110 volt A.C. power source 92, further amplifies the signal, and this signal is fed to the A.C. input terminals 94 and 96 of power rectifier 16. The A.C. input is then rectified to a D.C. output which is connected to anode array 26 and structure 28 by a pair of conductors 98 and 100 which in turn are connected, respectively, to the positive and negative output terminals 102 and 104 of rectifier 16.

From the foregoing it will be seen that amplifier 10, reactor 12, reactor 14, and rectifier 16 are in effect various stages of an amplification system for accepting a small D.C. input signal and amplifying it to a rather large D.C. output signal. The D.C. output signal comprises the impressed current for raising the electrical potential of structure 28 to provide the necessary cathodic protection therefor.

Thus, assuming as before that structure 28 is below the necessary potential to provide cathodic protection, the small input signal from reference circuit 20 of the monitoring means will be amplified through the amplification system just described, and the D.C. output of rectifier 16 will impress an electron flow through conductor 100 to structure 28, and thence through the electrolytic or water path to anode array 26 to complete the impressed electrochemical circuit.

As the control signal continues to flow through the reference circuit 20, the impressed current supply will be applied through the conductor 100 until such time as the potential of structure 28 reaches a level corresponding substantially with the potential of the drive bi-polar electrode 24. At this time, since there is substantially no potential difference between the bi-polar electrode 24 and structure 28, there will be a diminished flow of current through conductor 40 until a balance is achieved between the impressed current supply means for anode array 26 and the reference circuit 20. The leveling of the potentials of the bi-polar electrode 24 and structure 28 brings the system into balance.

Although it was assumed that the potential of structure 28 dropped an appreciable extent to initiate the above operation, it will be apparent that no appreciable drop will normally occur because the system tends to maintain a continuous balance between the impressed current system and the reference circuit 20. That is, any slight unbalance between the potentials of the bi-polar electrode 24 and structure 28 will be immediately corrected by the actuation of the impressed current system through the flowing of the control potential difference through the reference circuit 20. Likewise, as soon as the impressed current means has brought the potential of structure 28 to its proper level, the potential between 24 and 28 comes into balance and only the required current flow occurs through the reference circuit 20 to maintain the structure's preset polarization level. Excepting when the structure to be cathodically protected is subjected to an extraneous source of current, as will appear hereinafter, this balancing of the potentials of the bi-polar electrode 24 and structure 28 of the reference circuit 20, provides a constant reference potential. That is, excluding the exception, the adjusted potential of anode 22 and the bi-polar electrode 25 always remains substantially constant and thereby provides a continuously, reliable and relatively unchanging reference base or reference potential for the electrochemical drive to the drive-bi-polar electrode 24.

The reference potential in reference circuit 20 is, as previously stated, that potential at which satisfactory cathodic protection is provided to structure 28 when structure 28 is also near that potential. The potential of reference circuit 20 may be established independently by utilizing the well known reference electrode or half cell (not shown). Such a reference electrode can be of any suitable type such as the silver-silver chloride reference electrode which has a potential in the electrolyte 30 which differs from the potential of the structure 28 when it is submerged in the electrolyte. The reference electrode can be utilized in combination with any suitable micro-voltmeter or sensitive recording instrument to determine the achieved polarization level of the structure.

The level of the current flow necessary to cathodically protect the structure 28 may be determined by adjusting the resistances 29 and 33 until the independently connected reference electrode indicates that the potential of structure 28 is satisfactory to provide cathodic protection. Once this resistance is determined, the polarization reference electrode and meter could be disconnected, but for practical purposes it is usually left installed to afford a constant reading or recording of the potential of structure 28.

The resistance of approximately 1500 ohms, offered by the coil 21 of the signal amplifier 10 and which is in series with the reference circuit, provides a stabilizing effect of the reference circuit. However, under certain conditions as for example, if the galvanic couple of a neighboring hull is being maintained at a higher voltage than that of the structure, to which the present system is applied, the higher voltage of the cathode anode couple of the neighboring hull would, except for the improvement herein, have sufficient influence on the lower voltage of the instant structure, to which the present system is applied, so as to increase the potential on the instant hull and consequently the reference circuit 20, and once being increased, such high potential will tend to remain for a period sufficient to be extremely detrimental to the hull, although the high voltage source of current is removed. As is well known too high potential causes the generation of hydrogen in the steel hull below the paint, causing the stripping of the paint.

I have discovered that by maintaining a voltage in the generating circuit 17 (which circuit includes the same electrolyte as that of the adjacent hulls) at a higher value than any potential to which the system is subjected, for example at a higher voltage than that of the cathode anode couple of the neighboring hull, the too high voltage of the cathode anode couple of the neighboring hull will have only a minor effect galvanically on the instant hull because it is substantially dominated by the higher voltage of the generating circuit 17. As an example, if a potential of 1000 millivolts is desired at the hull, the voltage at the drive bi-polar electrode is maintained at approximately 1020 millivolts; the voltage at the bi-polar electrode is maintained, for example, at 1800 millivolts and, of course the resistance 33 is adjusted to cause the drop from 1800 millivolts to the desired 1020 millivolts at the drive bi-polar electrode 24. Thus a substantially constant voltage is maintained at the drive bi-polar electrode 24 yet a substantial dominating high voltage is maintained in the generating circuit 17, and this high voltage across this monitoring cell is of such higher value, than any other extraneous potential that may be impressed on the hull, that such extraneous potential has only a minor and temporary effect on the hull of the ship being protected by my three electrode monitoring system or control.

I have discovered further that constant voltages can be maintained at the bi-polar electrodes regardless of the conditions to which the system is subjected, provided of course that there is no failure of the extraneous source of current. I assure these constant voltages by directly, electrically connecting the anodes 26 and 22 with one another, as by a solid state conductor 59.

For reasons hereinafter specified, it is desirable to include a variable or adjustable resistance 61 and a diode 63 in the conductor 59. This diode may be of any suitable electrical value that permits electrons to flow therethrough in one direction but prevents electrons from flowing in the opposite direction. The diode in the instant case permits electrons to flow from anode 22 to the anode array 26 but prevents the flow of electrons in the opposite direction. Diode 63 is preferably one of the fused junction silicon types having a very low forward resistance.

The arrows, shown in full lines, illustrate normal electron flow during periods of current flow to cause an increase or maintain polarization on the ship or structure. The arrows, shown in dotted lines, illustrate electron flows to block further polarization rise on both the structure and the cell 25—24 and also illustrates that the flows continue in the same direction within the bi-polar cells 22—25 and 25—24 during this period. The full and dotted arrows, indicating electron flows, are indicating the direction of the electron flows in the metallic conductor and the direction of the electron migration in the ionic exchange phenomena of the electrolyte or seawater 30.

It will be noted that the positive impressed current anodes 22 and 26 pick up electrons from the electrolyte whereas the bi-polar electrodes 24 and 25 which serve as highly negatively impressed anodes emit electrons to the electrolyte as well as delivering their electrons through the metallic circuit to a lower negative electrode 28 or structure. It will also be noted that during the period of suspension, due to the fact that the structure 28 is at the desired polarization level, the structure will still continue to emit an emission of electrons to the electrolyte which represents the principal electrical load of the entire system. The automatic control system is devised to feed an amount of current to the structure to exactly balance the amount of this electron emission which takes place at the desired polarization level. The emission rate of this election emission from the surface of the structure is governed by the environment and varies with velocity, temperature, ionic content of the seawater temperature, condition of paint coatings, etc.

The common conductor 59 that connects the anode array 26 and the pilot anode 22 serves to connect the two separate and complete impressed current system within the common electrolyte into a series opposition arrangement, with a governing bi-polar electrode 24 disposed and electrochemically connected between their respective cathodes 28 and 25 of each cell. The pre-set potential across the cell 22 and 25 maintains the desired elevated polarization that provides current to saturate coil 21 that initiates the amplification necessary to deliver the rectified D.C. current to the structure cell 28 and 26. If the current demand across this cell 28—26 is great, a voltage increase across this cell is necessary to drive the greater current requirements. If it were not for the conductor 59, connecting the anode array and the pilot anode 22, the sudden reverse electron flow from structure 28 to the drive bi-polar electrode 24 would cause an instantaneous false polarization rise on this electrode 24 that would tend to further elevate the potential on structure 28. This is possible due to the fact that the subject electrochemical cells are in a common electrolyte and in close proximity to each other. This false polarization increase is prevented however by the addition of the conductor 59 connecting the anode array 26 and the pilot anode 22. The described surge of electrode 24 communicates through the pilot cell 25 and 22 and returns through the conductor 59 connecting the pilot anode 22 and anode array 26; thus, the pilot bi-polar cell 22—25 and the drive bi-polar electrode 24 can maintain the precise desired potential elevation over that of the structure cell in order to provide the necessary current demand to the magnetic amplification system to deliver necessary A.C. power to the rectifier to deliver the correct amount of D.C. current to the structure to maintain the desired pre-set polarization level of the structure.

Let us assume that the impressed current cell including the anode array 26, the cathode or structure 28 and electrolyte, is subjected to a higher voltage than that desired, or for example, subjected to the influence of the galvanic action of a neighbor ship of higher voltage, the system, nevertheless, will remain in perfect balance since the increased voltage will not affect the voltage of the cell including the pilot anode 22 and bi-polar electrode 25.

From FIG. 3 it will be seen more clearly why this phenomenon of constancy of voltages, respectively, at the pilot cell 22—25 and cell 25—24 are maintained.

I have found that, prior to the advent of employing the conductor 59 between the anodes 26 and 22, where a too high voltage is impressed on the impressed current cell, namely the hull 28, anode array 26 and electrolyte (which shall be at times referred to herein as the "ship's cell"), the potential of the drive bi-polar electrode 24 was increased beyond that desired, resulting in a false (too high) monitoring of the input to the ship's hull through the instruments 10, 12, 14 and 16. It is believed that such undesirable increase in potential of the drive bi-polar electrode was caused by the fact that, since the pilot cell 22—25 and the ship's cell are in the same electrolyte, the increased emission of electrons from the hull, due to the increase in voltage in the ship's cell, was picked up by the pilot cell anode 22, resulting in an increase in voltage at the pilot cell 22—25, which in turn caused an undesirable increase in voltage between the cells 25—24. I have discovered that by providing a common conductor of the solid state type, such as conductor 59, connecting the anodes 22 and 26, I have provided a ready path for the flow of electrons from anode 22 to anode 26; therefore the tending, negating effect of the electron emission from the hull 28 on the anode 22, due to increased emission at high voltage of the ship's cell, is obviated, since the conductor 59 provides the ready dissipating path for electrons from anode 22 to the more positive anode 26. Since the electrodes 22, 24 and 25 are relatively small, usually platinum of fourteen guage wire, approximately three inches in length, and since the are substantially juxtaposed, being separated only sufficiently to provide desirable electrolytic and galvanic relationships and since all three are disposed in a container such as that shown and described in the co-pending application Serial No. 625,708 filed December 3, 1956, and are spaced from the ship's hull, and due to the use of the conductor 59, material changes in voltage of the ship's cell have little or no effect on the cells 22—25 or 25—24.

I prefer to use a resistance 61 in the conductor 59 since, at times, it may be desirable to expedite polarization of the structure, in which event the resistance is utilized to impede the flow of electrons from anode 22 to anode array 26, resulting in impressing a high voltage across pilot cell 22—25 and across cell 25—24. This causes an increased differential in potential between drive bi-polar electrode 24 and the ship's hull 28, and a consequent voltage increase across the "ship's cell" resulting in a greater current impression on the hull 28 through the instruments 10, 12, 14 and 16. This resistance 61 is preferably of the variable type whereby the degree of impressed current on the hull can be controlled.

To further assure that the system "fails safe" i.e., no current is impressed on the ship's hull in the event of improper magnification of the monitoring electrodes, as for example removing the casing, containing the electrodes, from the electrolyte and then not restoring same to the electrolyte, I utilize the diode 63. Inasmuch as the diode 63 prevents current flow from anode array 26 to anode 22, the circuits for the monitoring system are completed only through the electrolyte. Should the monitoring electrodes be withdrawn from the electrolyte and unintentionally not restored to the electrolyte, the drive circuit 20, coil 21, 60, 28 is incomplete since such circuit depends upon its completion through the electrolyte, i.e. current cannot flow through a circuit including the extraneous source 34, resistance 29, conductor 31, resistance 33, conductor 40, coil 21, conductors 60 and 100, rectifier 16, conductors 98, 59 and 27, since the diode 63 prevents the flow of electrons in that direction. Consequently, should the monitoring electrodes be withdrawn from the electrolyte, coil 21 will be de-energized, resulting in rendering the instruments 10, 12, 14 and 16 ineffective to impress current on the hull. Thus, the system fails safe should the monitoring electrodes be withdrawn from the electrolyte.

Another advantage of this positively closed loop electrical circuit (i.e. the electrical circuit of solid state components including power rectifier 16, conductor 98, the anode array 26, conductor 59, signal anode 22, bridge 32, resistance 29, wire 31, and bi-polar anode 25, and power rectifier 16, conductor 60, 21, 40, 20, drive bi-polar electrode 24, resistance 33 and signal bi-polar anode 25) lies in the conservation of electrical energy during the period of the raising of the polarization level of the structure, such as 28, from, for example its normal static potential to that necessary to prevent dissolution in the electrolyte. It will be understood that time is a factor in increasing the polarization of steel, for example. Too, ample power must be available at all times, at the rectifier 16, to raise the potential of the hull 28 from its normal static level to that desired. When the hull is, for example, at its normal static, i.e., low polarization level, the voltage impressed thereon through the rectifier tends to be relatively high and may be of such high value as to effect an undesirable emission flow from the hull 28 to the pilot anode 22, resulting in a false polarization of drive bi-polar anode and a consequent undesirable and wasteful increase of current output at the rectifier 16. This however, is prevented in the use of the common metal conductor 59 between anode 22 and anode array 26 as the electron flow from pilot anode 22 to the more positive anode array 26 restores the closed loop system to the initial potential balance. As was previously pointed out, the potential of the drive bi-polar electrode 24 is maintained, and thereby effecting accumulating polarization on the structure gradually and efficiently, i.e., over an extended period of time in complement with the ability of the steel to be brought to a desired polarization level.

The signal amplifier 10, the control reactor 12, the power reactor 14 and the power rectifier 16 may be of the type shown in my co-pending application Serial No. 734,322 filed May 9, 1958.

There are no moving parts in the system. Thus, in contrast to other systems, my system has no mechanical relays, contact points, servo mechanism, motorized variacs or other moving parts which would require extensive and continued maintenance. By utilizing saturable core reactors, magnifications of a high order are obtained by devices which have a relatively long life and require no maintenance. A precise control is obtained which has an almost instantaneous response and which closely follows the demand on the system. Such performance coupled with the lack of maintenance is particularly important in systems of this type which are often installed in large ships which may not return to their home ports for long periods of time. If this were not the case, a breakdown of the system while the ship was out of port could permit severe damage to occur to the hull of the ship before the system could again be placed in operation.

It is also apparent, from the foregoing, that I have provided a system in which the polarization level of the reference drive bi-polar electrode is maintained constant or substantially so. Thus providing means to establish a predetermined polarization balance between a structure or ship to be cathodically protected and means to provide the required impressed current supply to the structure, responsive to the polarization balance demand.

Also it is apparent that I have provided a system which "fails safe" in the event of failure, for any reason whatsoever, of the reference circuit. In the event of failure of the reference circuit, there will be no flow of current through conductor 40 to actuate or energize signal amplifier 10 so that the means for impressing current will be rendered ineffective or inoperative. In this manner, paint stripping and other damage to the structure 28 due to over polarization is prevented.

It is also apparent that in addition to being useful for the cathodic protection of the hulls of ships, barges and other floating vessels, my system can be used for cathodically protecting other structures such as underwater foundations, pipe lines, storage reservoirs and the like.

While the forms of embodiment herein shown and described constitute preferred forms, it is to be understood that other forms may be adopted falling within the scope of the claims that follow:

I claim:

1. In a control system for cathodically protecting a structure immersed in an electrolyte, an anode immersed in the electrolyte; means connected to said anode and structure and operative to impress a current flow between said anode and the structure to raise the potential of said structure and cause it to serve as a cathode; a monitoring system including a drive bi-polar electrode, an electrical conductor connecting said structure to the drive bi-polar electrode, a second bi-polar electrode, means including a resistance connecting said drive and bi-polar electrodes, a second anode, means including an extraneous source of D.C. current between the second mentioned anode and the second mentioned bi-polar electrode, said bi-polar electrodes and last mentioned anode being immersed in said electrolyte; and means responsive to the flow of current from the drive bi-polar electrode to said structure for controlling the first mentioned means.

2. A control system as defined in claim 1, characterized in that the drive bi-polar electrode is formed of substantially inert material.

3. A control system as defined in claim 1, characterized in that the second mentioned bi-polar electrode is formed of substantially inert material.

4. A control system as defined in claim 1, characterized in that the pilot anode is formed of substantially inert material.

5. A control system as defined in claim 1, characterized to include an electrical conductor directly connecting said anodes with one another.

6. A control system as defined in claim 1, characterized to include a resistance between the extraneous source of current and the second mentioned bi-polar electrode.

7. A control system as defined in claim 1, characterized to include a resistance between the extraneous source of current and the second mentioned bi-polar electrode and further characterized to include an electrical conductor directly connecting said anodes with one another.

8. A control system as defined in claim 1, characterized to include a solid state conductor connecting said anodes.

9. A control system as defined in claim 1, characterized to include a solid state conductor connecting said anodes, and including a diode in said conductor for preventing the flow of emission from the first to the second mentioned anode.

10. A control system as defined in claim 1, characterized to include a solid state conductor connecting said anodes and an adjustable resistance in said conductor.

11. A control system as defined in claim 1, characterized to include a solid state conductor connecting said anodes, an adjustable resistance in said conductor, and including a diode in said conductor for preventing the flow of emission from the first to the second mentioned anode.

12. In a control system for cathodically protecting a structure immersed in an electrolyte, an anode immersed in the electrolyte; means connected to said anode and structure and operative to impress a current flow between said anode and the structure to raise the potential of said structure and cause it to serve as a cathode; a monitoring system including a drive bi-polar electrode, an electrical conductor connecting said structure and the drive bi-polar electrode, a second bi-polar electrode, means including a resistance connecting said drive and bi-polar electrodes, a second anode, means including an extraneous source of D.C. current between the second mentioned anode and the second mentioned bi-polar electrode for impressing current on the second mentioned bi-polar electrode, said bi-polar electrodes and last mentioned anode being immersed in said electrolyte; and means responsive to the increase and decrease in flow of current from the drive bi-polar electrode to said structure for increasing and decreasing, respectively, the value of the impressed current of the first mentioned means.

13. A controller for a system including a cathode, an anode, both immersed in an electrolyte and which cathode and anode function to impress current on the cathode, which controller comprises a drive bi-polar electrode adapted to be connected in a control circuit of the system; a second bi-polar electrode; a resistance connecting said bi-polar electrodes; a second anode; and means connecting the second mentioned anode and both bi-polar electrodes and including an extraneous source of current for impressing a current on the second mentioned bi-polar electrode.

14. A controller as defined in claim 13, characterized in that the drive bi-polar electrode is formed of substantially inert material.

15. A controller as defined in claim 13, characterized in that the second mentioned bi-polar electrode is formed of substantially inert material.

16. A controller as defined in claim 13, characterized in that the control anode is formed of substantially inert material.

17. In combination with electrolyte, a cathode, and an anode in said electrolyte, and an electrical conductor connecting the anode and cathode; a second anode and a bi-polar electrode in an electrolyte, and an electrical conductor connecting the second anode with the bi-polar electrode, said electrode being cathodic with respect to the second anode; a second bi-polar electrode in an electrolyte and an electrical conductor connecting the second anode with said bi-polar electrode, said second bi-polar electrode being cathodic with respect to the first bi-polar electrode, and an electrical conductor connecting the second bi-polar electrode with the cathode; and an electrical conducor connecting said anodes.

18. The combination as defined in claim 17, characterized to include a resistance between said bi-polar electrodes.

19. The combination as defined in claim 17, characterized to include an extraneous source of current between the second mentioned anode and the first mentioned bi-polar electrode.

20. The combination as defined in claim 17, characterized to include an extraneous source of current between the second mentioned anode and the first mentioned bi-polar electrode, and a resistance between the extraneous source of current and the first mentioned bi-polar electrode.

21. The combination as defined in claim 17, characterized to include an extraneous source of current between the second mentioned anode and the first mentioned bi-polar electrode, and a resistance between the extraneous source of current and the first mentioned bi-polar electrode, and a resistance between the bi-polar electrodes.

22. The combination as defined in claim 17, characterized to include an extraneous source of current between the second mentioned anode and the first mentioned bi-polar electrode, a resistance between the extraneous source of current and the first mentioned bi-polar electrode, and a resistance between the bi-polar electrodes.

23. The combination as defined in claim 17, characterized to include a diode between the anodes for preventing the flow of electrons from the first to the second mentioned anode.

24. The combination as defined in claim 17, characterized to include an adjustable resistance in the second mentioned conductor.

25. The combination as defined in claim 17, characterized to include an adjustable resistance in the second mentioned conductor and a diode in said second mentioned conductor for preventing the flow of electrons from the first to the second mentioned anode.

26. In a control system for cathodically protecting a structure immersed in an electrolyte, an anode immersed in the electrolyte; means connected to said anode and structure and operative to impress a current flow between said anode and the structure to raise the potential of said structure and cause it to serve as a cathode; a monitoring system including a bi-polar electrode in said electrolyte, means including an anode and said electrolyte and an extraneous source of D.C. current between the control anode of the monitoring system and said bi-polar electrode for impressing current on said bi-polar electrode, and a solid state conductor directly connecting the anodes independently of said first and second mentioned means; and means responsive to the flow of current from the bi-polar electrode to said structure for controlling the first mentioned means.

27. A system as defined in claim 26, characterized in that the conductor between said anodes includes a diode for preventing the flow of electrons from the first to the second mentioned anode.

28. A system as defined in claim 26, characterized in that the conductor includes an adjustable resistance.

29. A system as defined in claim 26, characterized in that the conductor includes an adjustable resistance and includes a diode for preventing the flow of electrons from the first to the second mentioned anode.

References Cited in the file of this patent

UNITED STATES PATENTS

| | | |
|---|---|---|
| 2,759,887 | Miles | Aug. 21, 1956 |
| 2,903,405 | Sabins | Sept. 8, 1959 |

FOREIGN PATENTS

| | | |
|---|---|---|
| 669,675 | Great Britain | Apr. 9, 1952 |